United States Patent [19]

Klein

[11] E Patent Number: Re. 31,849

[45] Reissued Date of Patent: Mar. 19, 1985

[54] POROUS MEDIA TO SEPARATE GASES LIQUID DROPLETS AND/OR SOLID PARTICLES FROM GASES OR VAPORS AND COALESCE ENTRAINED DROPLETS

[76] Inventor: Max Klein, 46 Queen Anne Dr., Shrewsbury, N.J. 07701

[21] Appl. No.: 447,784

[22] Filed: Dec. 8, 1982

Related U.S. Patent Documents

Reissue of:

[64] Patent No.: 4,239,516
Issued: Dec. 16, 1980
Appl. No.: 18,472
Filed: Mar. 8, 1979

[51] Int. Cl.[3] ..... B01D 39/16

[52] U.S. Cl. ..... 55/389; 55/524; 55/527; 55/528

[58] Field of Search ..... 55/522, 524, 528, 389; 210/502-510; 162/145, 146; 131/202, 341, 332, 342

[56] References Cited

U.S. PATENT DOCUMENTS

| | | | |
|---|---|---|---|
| 3,019,127 | 1/1962 | Czerwonka | 55/316 |
| 3,228,825 | 1/1966 | Waggoner | 162/145 |
| 3,246,767 | 4/1966 | Pall et al. | 210/506 |
| 3,253,715 | 5/1966 | Painter et al. | 210/508 |
| 3,382,141 | 5/1968 | Arledter | 55/527 |
| 3,573,158 | 3/1971 | Pall et al. | 162/146 |
| 3,749,638 | 7/1973 | Renaud et al. | 162/145 |
| 4,084,949 | 4/1978 | Biggins | 162/146 |
| 4,207,378 | 6/1980 | Klein | 482/402 |
| 4,239,516 | 12/1980 | Klein | 55/528 |
| 4,293,378 | 10/1981 | Klein | 55/528 |
| 4,304,873 | 12/1981 | Klein | 162/146 |

FOREIGN PATENT DOCUMENTS

| | | | |
|---|---|---|---|
| 1957763 | 5/1971 | Fed. Rep. of Germany | 131/202 |
| 6801723 | 8/1968 | Netherlands | 131/265 |
| 868651 | 5/1961 | United Kingdom . | |
| 1070737 | 6/1967 | United Kingdom . | |
| 1118221 | 6/1968 | United Kingdom . | |
| 1364762 | 8/1974 | United Kingdom . | |

*Primary Examiner*—Bernard Nozick
*Attorney, Agent, or Firm*—Dann, Dorfman, Herrell and Skillman

[57] ABSTRACT

Gas-vapor treating and filter mats composed of glass fibers intermixed with micro-bits of any of an expanded thermoplastic styrene-polymer or expanded thermoplastic lower polyolefin or flexible foam polyurethane and a suitable organic bonding agent, which mat may contain any of fibers of a fiber-forming terephthalate polyester, activated carbon, and gas-vapor adsorbent crystalline zeolite molecular sieve particles.

32 Claims, No Drawings

POROUS MEDIA TO SEPARATE GASES LIQUID DROPLETS AND/OR SOLID PARTICLES FROM GASES OR VAPORS AND COALESCE ENTRAINED DROPLETS

Matter enclosed in heavy brackets [ ] appears in the original patent but forms no part of this reissue specification; matter printed in italics indicates the additions made by reissue.

BRIEF DESCRIPTION OF THE INVENTION

This application is a continuation-in-part of copending application Ser. No. 877,190 filed Feb. 13, 1978, now abandoned.

This invention is that of (a) porous media, briefly called gas-vapor mats or gas-vapor filtering or treating mats, having good tensile strength and porosity to provide maintained good flow-through rates but yet being sufficiently dense to enable filtering finely divided solid particles and/or entrained liquid droplets from aerosols or gases and/or vapor streams, as well as coalescing liquid droplets entrained in them, and also capable of separating some gases from such streams, and (b) the preparation of these mats.

The gas-vapor treating mats of the invention consist basically of (a) [a major portion of] *an intimate mixture of* very small (e.g. average 6.3 microns) diameter glass fibers [composed of a plurality of filaments and of short length about 0.635 cm. long, and intermixed therewith] *the length of which are at least about 6.3 millimeters and below the length at which the fibers are prone to roping,* (b) [a minor amount of so-called] micro-bits of (i) an expanded thermoplastic styrene-polymer and/or expanded lower polyolefin and/or (ii) a flexible foamed polyurethane, each of the members (i) and (ii) being non-brittle in expanded form, and (c) a [still more] minor amount of (i') an organic binding agent insoluble in cold water, but soluble in hot water and inert to the glass fiber and the polymer micro-bits and any other constituent of the mat as well as to the contents of the gaseous and/or vapor stream to which the mat is to be exposed, or (ii') a cobeat (as described further below) of wet lap cotton fibers and micro-bits. A gas separation embodiment of these mats also includes polyester fibers and activated carbon. The activated carbon can be replaced as a whole or, under some circumstances, in part by gas-vapor adsorbent, zeolite molecular sieve particles.

BACKGROUND OF THE INVENTION

A web of merely glass fibers such as the Owens-Corning DE 636 (described in Example 1 below) bound with polyvinyl alcohol (98% hydrolyzed) was made but its use had been rather restricted. For example, it has been used as a battery plate separator and as the base for roof covering to be coated over with tar. However, no such web of glass fiber and polyvinyl alcohol (i.e. called PVA) has been known for use in any such treatment of fluids as described above.

For many years various industries have been concerned with troublesome solid particles of fine droplets of liquids or harmful gases released into working areas and often passing through vents or smoke stacks into the outside atmosphere, thus provoking bothersome evnironmental problems. In some cases, it has been merely dust particles from working with inorganic materials such as recovering minerals from ores or grinding and polishing operations.

In other cases also involved are liquid droplets entrained from chemical operations such as electroplating, spray coating of one kind or another or production of certain synthetic resins. In still other situations it may be harmful gases, for example, sulfur dioxide carried into the atmosphere as from burning of high sulfur content fuel oils or bituminous coals. Production of a polyphenylene oxide-polystyrene alloy polymer involves release in part of resin fines or pellets, dust particles and of oily plasticizer droplets entrained apparently as an aerosol into the air.

Some attempts to overcome some of these problems have been made by using (i) a filter medium such as a mat of glass fibers held together by a phenol formaldehyde resin binder, or (ii) glass wool air filters in window openings or other outlets. However, generally these filter media are bulky and yet not dense enough to restrain the finer particles or gases, thus still allowing undesirable fluid passage through them and thereby still to pass out to the atmosphere. Then also some of these mats, among other shortcomings, have an undesirably limited tensile strength resulting in too frequent breaks requiring interrupting their use in undue time-consuming repair.

Other attempts include use of electric charging precipitators, such as the long known Cottrell electric precipitators, but these are costly to install, operate and maintain, and do not restrain merely gases, for example, sulfur dioxide.

These disadvantages are overcome by the gas-vapor filter of treating mats of the invention. Then too, these mats of the invention show enhanced porosity and tensile strength over the above described glass fibers and PVA webs used as battery separators and in roof covering sheets.

GENERAL DESCRIPTION OF THE INVENTION

Considered broadly, the gas-vapor treating mats of the invention comprise glass fibers (usually composed of a plurality of filaments) varying in diameter from about 3 to about 12 microns, generally more readily applicable as of about 6.3 microns, and more often selected as about [0.635 cm. (i.e. centimeter)] *6.35 mm.* long, and intermixed with micro-bits of any of an expanded, thermoplastic styrene-polymer, as expanded lower polyolefin [from polyethylene to poly-methylpentene] *which is the polymer of an ethylenically unsaturated hydrocarbon monomer having from 2 to 6 carbon atoms,* and a flexible foamed polyurethane, each said polymer being non-brittle in expanded form; and with the fiber glass and polymer micro-bits being (a) bonded (primarily at their intersections) by a compatible organic binder insoluble in cold water and soluble in hot water (e.g. at about 80° C. as for PVA) and inert to the micro-bits, the glass fiber and any other mat constituent as well as the gases (including any entrained liquid droplets or aerosols and fine particles) that are to contact or be treated with the mat, or (b) held together by a cobeat of wet lap cotton fibers and polymer micro-bits (as described below in Example 5).

The micro-bits can amount to from about 5 to about 50% of the mat, and beneficially from about 10 to about 35%, and advantageously from about 15 to about 25%; [and] the compatible organic chemical binder *may be* present at from about 2% to about 10% and beneficially at from about 5 to about 8%, or the cobeat of cotton fibers and micro-bits [being] *may constitute* from 5.8 to about 11% *of the mat*; and [with] the glass fibers [present in an amount sufficient to] to make up the [total of the 100% content] *remainder of the mat*. The tensile strength of the mats varies from about [0.9] *0.2* to about 5.34 kg. per cm. and the porosity varies from about 152 to 914 liters per sq. dcm. (i.e. square decimeter) per minute at 2.54 cm. ($H_2O$).

The micro-bits component of the gas-vapor treating mats of the invention are micro-bits of any of an expanded, thermoplastic styrene-polymer or lower polyolefin, non-brittle in expanded form, or of a flexible foamed polyurethane likewise non-brittle in expanded form. These micro-bits of an expanded, thermoplastic styrene-polymer or lower polyolefin are more fully described (as in my copending United States of America patent application Ser. No. 833,644 filed Sept. 15, 1977, *now U.S. Pat. No. 4,207,378*) as an expanded, thermoplastic, non-brittle in expanded form polymer selected from a styrene-polymer and a lower polyolefin from polyethylene to poly-methylpentene, and characterized [by being in the form of micro-bits and] *as being*, (a) from about 40 to about 325 microns long and from about 20 to about 325 microns wide, (b) from substantially completely to entirely completely free of intact cells of the expanded polymer bit-pieces from which they were produced, (c) substantially without any uniformity in outline of the individual micro-bits particles, and (d) in density from about 85 percent of, to about substantially the same as, the specific unexpanded polymer from which there was provided the aforesaid expanded polymer.

These micro-bits of an expanded, thermoplastic styrene-polymer or a lower polyolefin are produced from so-called bit-pieces of any of the expanded thermoplastic, non-brittle in expanded form styrene-polymers or lower polyolefins as starting material. By "bit-pieces" is meant any of the discrete free-flowing forms of any of these styrene-polymers and lower polyolefins, such as (i) the various sizes of granules made by cutting the respective extruded polymer into fairly small lengths usually called pellets or crystal (as with a styrene-polymer) or pellets or cubes of a [polyethylene-polystrene] *polyethylene-polystyrene* alloy, (ii) the various sizes of styrene-polymer beads obtained from suspension polymerization or otherwise as by molding the particles obtained by disintegrating any of these different polymer forms, (iii) the so-called "grind" including the coarsely ground molded polymer or waste or other scrap such polymer of various sizes e.g. 3.175 millimeter (i.e. [ml.] *mm.*) thick, 6.35 [ml.] *mm.* wide, and 9.535 [ml.] *mm.* long, and (iv) any other small sized shapes of any of them.

The preparation and properties of flexible polyurethane foams are described, for example, in the "Handbook of Foamed Plastics", Bender, Rene J., Section X, pp. 173-236, Lake Publishing Corporation, Libertyville, Ill., U.S.A. (1955), "Polyurethanes: Chemistry and Technology", Saunders & Frisch, Chapter VII, Part II, Interscience Publishers, New York, N.Y. U.S.A. (1964), and "The Development and Use of Polyurethane Foams", Doyle, E. N., pp. 233-256, McGraw Hill Book Company, New York, N.Y., U.S.A. (1971).

The flexible polyurethane foams useful to provide foamed polyurethane micro-bits preferably should be no greater than 95.3 gm. (i.e. grams) per liter in density, beneficially ranging from about 47.7 to about 15.9 gm. per liter, and show excellent recovery after 75% deflection with approximately less than 1% loss in height (as determined by American Society of Testing Materials D-1564-64T).

The flexible foam polyurethanes are not obtained in the foregoing same bit-pieces forms as are the styrene-polymers and lower polyolefins, but rather in continuous foamed blocks as a result of the reaction that provides the polyurethane. Accordingly, the foamed polyurethane blocks first are shredded into bit-pieces (for example, similar to how they may be prepared for use in stuffing into various articles).

The foamed polyurethane micro-bits are more fully described (as in my copending United States of America patent application Ser. No. 833,643 filed Sept. 15, 1977 *now U.S. Pat. No. 4,200,679*) as comprising broken and interconnected strand portions from adjacent cells of the flexible foam, which strand portions show substantially total absence of intact cells and cell windows and are tripodal particles with generally uneven length legs, the strand portions having hook-like projections, indentations and flutes resulting from destruction of the cells and cell windows of the starting flexible foam.

The micro-bits of any expanded thermoplastic, non-brittle in expanded form styrene-polymer or expanded lower polyolefin or flexible foamed polyurethane are prepared by disintegrating the respective starting expanded polymer bit-pieces in a comminuting machine such as that produced by Fitzpatrick Company (of 832 Industrial Drive, Elmhurst, Illinois 60120, U.S.A.) according to their Bulletin No. 152 copyright 1968 using the broached fixed blades (identified therein by "Code DS225") to replace the blades or other comminuting elements, mounted for rotation in the comminuting chamber model DAS06, both shown on that bulletin's page 5. That chamber is liquid-tightly capped, for example, by a cover such as shown in their Code M44D6 or Code MA44D6 (upper half of page 3 of their Bulletin 152).

That model DAS06 comminuting chamber is rectangular in horizontal cross-section and has a pair of opposed parallel entirely vertical walls integrally joined at each of their opposite ends by a separate one of a pair of opposed vertically arcuate walls each with its convex face exposed to the exterior.

Sixteen identical, slat-shaped comminuting arms are separately removably but fixedly carried with their snugly adjacent to one another bases encircled about, and keyed to, the operating shaft and intermediate its free outer mounting ends. These arms extend radially out from the shaft (e.g. 127 mm. from its axis to the outer end of each arm) with the first of each consecutive four of them extending horizontally toward one arcuate wall, the second of each four extending vertically, the third four of them extending toward the other arcuate wall, and the fourth four of them extending vertically downward.

Each arm is rectangular in cross-section in a plane running through the entire length of the shaft's axis and of that arm, and of each arm 180° removed from it. The outer end of each arm meets at right angles with its two wider sides (5.4 mm. width) and its narrow or impact side (9.525 mm. wide) facing the direction of rotation. That narrow side also meets at right angles with the two wider sides which are parallel to one another for most of their width and with the trailing third of their surfaces tapering to one another and terminating in the knife edge of their trailing end.

Each free exposed end of the shaft extends through its respective stuffing box in its neighboring one of the two parallel vertical walls on through a bearing carried on a respective trunnion affixed to the machine's foundation and spaced outwardly away from the respective wall. A driving pulley is mounted on each end of the shaft extending outwardly from its respective mounting trunnion.

The bottom of the comminuting chamber is an exchangeable dish-shaped, arcuate screen curved convexly downward with an inside radius (from the axis of the operating shaft) equal to the length of a comminuting arm plus 0.762 mm. clearance. The screen's overall rectangular peripheral opening has such dimensions and shape as to enable it to be removably fitted in a liquid-tight engagement with the bottom of the four walls of the comminuting chamber.

The screen has staggered rows of, for example, circular holes varying in diameter as from 0.102 to about 3.175 mm. and closely spaced to one another with sufficient space between them for the screen to hold up under working conditions.

Except for its starting material feed hopper inlet at one side of it, the rest of the chamber's cover is arcuate and convex upwardly with a radius (from the axis of the operating shaft) sufficient for the rotating arms to have a 0.762 mm. clearance from the inwardly facing surfaces of a plurality (e.g. three) pre-breaker bars (about 20.32 cm. long and 6.35 mm. wide) protruding for 3.175 mm. along their entire length of the interior of the comminuting chamber, and extending spaced apart from one another and parallel to the axis of the operating shaft.

The selected driving pulley on the operating shaft is connected by driving belts extending from a motor shaft drive pulley and can be operated at speeds embracing the range of from about 4700 to about 8000 r.p.m., and more effectively from about 5000 to about 7500 r.p.m.

The invention includes also a form of these mats, which can be called the gas-vapor adsorption filtering or treating mats. These include the basic or primary constituents (a) the glass fibers, (b) the micro-bits, and (c) the organic binding agent, each being within its earlier above recited respective range relative to the others of them, and together with an amount of any of (i) finely divided activated carbon (as primary gas-adsorbing agent) and (ii) finely divided molecular sieve particles (such as described further below) and under that at which undesirable dusting off of carbon or molecular sieve particles can occur, also a sufficient amount of the cobeat to serve to restrain the carbon or molecular sieve particles against dusting off, and an amount of a fiber-forming terephthalate polyester sufficient to hold the mat's tensile strength within its earlier above recited range without undesirable lowering of the mat's porosity.

Thus, for example, in addition to its three primary constituents (a), (b) and (c), these adsorption filtering and treating mats can contain, of their overall content, the activated carbon to a maximum of about 50%, the molecular sieve particles to the extent of about 75%, the polyester fibers in the range from about 2% to about [7.5] *12.2%*, and from about 2% to about 30% of cobeat.

Any of the gas-adsorbing activated carbons from their various sources, for example, charcoal, coal, petroleum distillation residue or pecan nut shells, can be used.

The herein applicable molecular sieve particles are referred to as the gas-vapor adsorbent zeolite molecular sieve particles. They are any of the crystalline, natural or synthetic zeolites of the type more specifically described further below.

The invention also involves the method of preparing these mats of this invention. Broadly the preparation of the gas-vapor treating mats comprises dispersing in water in a pulper (as used in paper making) an amount of (a) micro-bits of any of an expanded, thermoplastic styrene-polymer, and expanded lower polyolefin from polyethylene to poly-methylpentene and a flexible polyurethane, each said polymer being non-brittle in its expanded form, and (b) glass fibers composed of the glass filaments, as described above, and agitating the mixture of (a) and (b) for the brief time at least sufficient for each of them to be substantially free of clumps and clusters and substantially uniformly intermixed, [and in the proportion of from about 5 to about 50 parts of the micro-bits to from about 4 to 45 parts of glass fibers,] admixing an organic binding agent (as described earlier above) or a cobeat (as described further below) in an amount sufficient for the finished mat to have surface tension and porosity with each of them being within its respective earlier above recited range; then transferring the resulting mixture in a concentration of from about 0.1% to 0.5% of the admixed micro-bits and glass fibers to a supply chest and therein agitating their mixture merely sufficiently to maintain a uniform dispersion.

The dispersion then is fed from the supply chest to the furnish box (of the Fourdrenier machine) at the rate, for example, from about 3.3 to 5.5 kg. (i.e. kilogram) per minute and at the same time is diluted uniformly with water fed into the furnish box at the rate of from 3,800 to about 9,000 liters per minute.

The resulting diluted furnish slurry then is fed onto the Fourdrenier screen moving at a rate to provide a wet mat which after drying has a basis weight of from about 2.25 to about 22.5 kg; and continuously removing the web mat from the screen and running it through a suitable drying operation.

The gas-vapor treating mat can be prepared by including adding to the mixture in the pulper, beneficially before admixing any binding agent a separate amount of each of sodium hexametaphosphate and concentrated sulfuric acid and in such proportion to one another sufficient to lower the pH of the mixture to 2.5.

The gas-vapor adsorption treating mats are prepared by a combination of steps comprising preparing a cobeat suspension of wet lap cotton fibers and micro-bits in water (as described further below) and separately producing a suspension of micro-bits in water in the proportion recited further below.

Then a furnish supply suspension is prepared by admixing in water an amount of the cobeat suspension within a given range and adding a quantity of a fiber-forming polyethylene terephthalate polyester in a quantity to partake in providing the finished mat with tensile strength within an effective range without adversely affecting its porosity. Then any of the finely divided activated carbon and/or molecular sieve particles are admixed within the range up to a maximum of about 50% (for the carbon alone), and 75% (for the molecular sieve particles alone) of the planned total solids of the finished mat, and an aqueous suspension of the microbits is added in an amount to provide in the finished mat from about 5% to about 30% of micro-bits.

The [remaining addition admixed] *resulting admixture* is a suspension of glass fibers, micro-bits and binding agent, each within its respective range as earlier recited for the gas-vapor treating mat and so proportioned to the other solids for the finished mat to have the planned tensile strength and porosity. The finally resulting suspension from all of these included constituents is fed to the furnish box within the rate of feed recited for the mats lacking the carbon and polyester, and there similarly diluted with water and then fed onto the Fourdrenier screen and dried as with the other mats.

In each of the procedures preparing a mat wherein an organic binding agent is used, it is beneficial to add that agent to the suspension (being prepared) within the last minute or so of the agitation before the suspension is to be fed to the (machine) supply chest and also that the web leaving the Fourdrenier screen initially is subjected to radiant heat from a relatively close source at a temperature in the range of from about 600° C. to about 700° C. That rapidly causes the solution of the [polyester] *binding agent* in the water carried by the mat and enhances the drying of the [polyester] *binding agent* at the intersections of the water-insoluble constituents.

The preparation of any of the desired styrene-polymer, lower polyolefin or polyurethane micro-bits from starting bit-pieces of any of the respective expanded polymers (styrene-polymer, lower polyolefin or polyurethane) is illustrated in, but not restricted to, the following preparation of polystyrene micro-bits:

EXAMPLE A—Micro-Bits From Expanded Extruded Polystyrene Pellets 425 liters of expanding-agent-impregnated, extruded polystryene pellets (crystal) expanded to from about 6.35 to about 12.7 mm. substantially round pellets having a bulk density of 12 grams per liter were comminuted in a comminuting machine (as described earlier above) equipped with an input feeder 10.16 cm. in diameter by 7.62 cm. long and a bottom arcuate screen with holes of 0.1016 mm. diameter.

The rotor was set to run at 6,000 r.p.m. and the feeder set to charge the expanded polystyrene bit-pieces at the rate of 35.4 liters every 5 minutes (i.e. 425 liters per hour). The starting expanded polystyrene bit-pieces to be introduced into the feeder were wetted with sufficient water substantially completely to cover their outer surfaces. The thus wetted expanded polystyrene bit-pieces were charged into the feeder continuously at a rate of 35.4 liters every 5 minutes, while at the same time water was injected into the comminuting chamber through the two 1.6 mm. diameter jet orifices at a rate of 7.57 liters per minutes.

The mixture of the expanded polystyrene micro-bits in water leaving the screen bottom of the comminuting chamber was collected in an open tank with a bottom drain plug, wherein the free water settled to the bottom and the polystyrene micro-bits with the bound water held by them (in the proportion of 2 parts of micro-bits to 98 parts of water), due to the entrapped air, rose on top of the free water. The free water was drained off leaving behind a plastic mass of the resulting expanded polystyrene micro-bits in the water physically bound to them. The plastic mass weighed 255.15 kilos and contained 5.1 kilos of micro-bits with 250.05 kilos of water bound by them.

27.24 kilos of this plastic mass, placed in a close weave double cotton bag, then were subjected to pressure until 22.71 liters of water were expressed. The remaining 4.08 kilos containing 544 grams of expanded polystyrene micro-bits then were dried in an open dish in an oven maintained at 43.33° C.

Micro-bits of any other thermoplastic expanded styrene-polymer of lower polyolefin, each non-brittle in expanded form, or of any flexible foamed (i.e. expanded) polyurethane non-brittle in its foam or expanded form can be prepared by repeating Example A and replacing its starting polystyrene bit-pieces by bit-pieces of any of these other applicable expanded polymers. Thus, each such repeat of Example A starting with the micro-bits of each such other applicable expanded polymer is to be considered as if incorporated herein in full as a separate example, thereby avoiding unnecessarily extending this specification.

The preparation of the gas-vapor treating mats of the invention is illustrated by, but not limited to, the following examples:

EXAMPLE 1

Basic Gas-vapor Treatment Mat

Into 15,139 liters of water charged into a (paper making) pulper (of very little greater capacity), there was fed by an endless belt conveyor 23.27 kilos (dry basis) of polystyrene micro-bits (in the form of water-bound product containing 8% micro-bits solids). The pulper contents mixture then was agitated for 3 minutes by its rotor turning at 506 revolutions per minute (r.p.m.) thereby dispersing the micro-bits in the water.

While agitating the mixture, 22.73 kilos of sodium hexametaphosphat were admixed and followed by admixing 3.785 liters of concentrated sulfuric acid (98.6% $H_2SO_4$). That brought the pH of the batch to 2.5.

The agitation was stopped while there was added (from a number of cartons) a total of 113.64 kilos of 6.35 millimeters (length) glass fibers (diameter 6.3 microns) Owens-Corning electrical grade DE 636 as the number of filaments per bundle (and bound by a starch, oil and cationic surfactant binder).

The rotor agitation was resumed and continued for 10 minutes, during the last 30 seconds of which 10.25 kilos of (cold) water-swellable polyvinyl alcohol (98% hydrolyzed) (herinafter called PVA) fibers were added as binding agent. The thus completed initial pulper mix was pumped to the beater chest (serving only as holding facility to receive amounts of pulper mix) and agitated there merely sufficiently to maintain the insolubles in suspension.

7570 liters of (rinse) water then were added to the pulper and agitated to suspend any glass fibers and/or micro-bits which settled out and remained behind while the initial pulper mix was being pumped to the beater chest. The resulting so-called pulper rinse mix then was pumped to the beater chest and there admixed into the initial pulper mix to provide the starting mat-making mix containing 0.64% solids.

This starting mat-making mix then was pumped to the machine chest (also a supply holding chest) with its contents maintained under agitation also as in the beater chest. From this supply chest the mat-making mix was fed to the furnish box for the Fourdrenier at a rate of 4.32 kg. solids per minute and there combined with clear dilution water at a rate of 6056 LPM.

The resulting uniform web-furnish slurry (as diluted in the furnish box) was fed onto the traveling Fourdrenier screen (86 strands in the machine direction and 60 strands across) moving at a rate of 15.24 meters per minute (i.e. MPM) to enable providing an initial web mat which after later finished drying showed a basis weight of 19.1 kg.

The 9.525 mm. thick wet mat (on the Fourdrenier) after passing the suction boxes under the leaving end of the Fourdrenier screen continued onto an endless belt conveyor (a 112 by 84 mesh screen) also at 15.24 MPM. Then after about 1.5 meters beyond that end of the Fourdrenier, the wet mat (on that conveyor) passed about 10 cm. below a battery (about 60.5 cm. long) of infrared lamps (52.4 kilowatts, at 3.8 amperes, 480 volts, single phase 60 cycle) providing at the mat surface a rheostat set temperature of possibly 649° C. The exposure of the wet mat to that temperature thus for about 2.4 seconds quickly caused solution of the PVA.

The partially dry web continued through a tunnel dryer (about 3.67 meters long by 1.83 meters wide) providing a temperature of about 121° C. and then alternated in sequence over one and then under the next of each of a series of six dryer drums (the first drum providing a temperature of 113° C. with the temperature increased at each of them that followed with the last drum maintained at 127° C. The finally dry mat then passed through a pair of tension rollers and onto a wind up drum. That dry mat web with a smooth surface on each side wound up easily around that drum without any tears or wrinkles.

At its basis of 19.1 kilos, the finished gas-vapor treating web showed a porosity value (by Gurley porosity meter) of about 602.8 liters per minute (i.e. LMP) per square decimeter (i.e. sq. dcm.) of surface at a test differential air pressure of 2.54 centimeters of water (gage).

Based on the starting amounts of the essential materials, the finished dry gas-vapor treating mat contains about 15.8% of the expanded polystyrene micro-bits, about 77.2% of glass fibers and about 6.97% of polyvinyl alcohol binder. The content of these essential constituents may be varied in accordance with desired variations in porosity, gas or vapor fluid flow rate and density by suitable variations in the constituents content. For example, the porosity can be decreased by lowering the micro-bits content to any level down to a minimum of about 2% without corresponding decrease in tensile strength.

Alternatively, the porosity and flow rate can be increased by increasing the micro-bits content, as in some formulations, to any level even up to 50%, of the total solids.

Example 1 can be repeated by reducing the quantity of sulfuric acid in part or as a whole and also by reducing the amount of sodium hexametaphosphate (ordinarily used to enhance glass fibers dispersion) in whole or in part in preparing the initial pulper suspension, in view of the indication that the micro-bits appear to enhance dispersion of the solid constituents during agitation in the water.

Depending on the anticipated ultimate use of the gas-vapor treating mat its basis weight can be reduced or enlarged by either decreasing or increasing the solids content in the aqueous furnish in the furnish box or increasing or reducing the speed of the Fourdrenier screen.

EXAMPLE 2

Basic Gas-vapor Treating Mat With Polyurethane Micro-Bits

Into a 3.5 liter stainless steel beaker containing 3 liters of water, there was dispersed 21.5 grams of (furniture grade) flexible polyurethane micro-bits containing 20% solids (thus 4.3 grams of micro-bits dry basis and 17.5 cc. of water) by an air driven stirrer. Then 15 grams of the same 0.635 cm. length DE 636 glass fiber (as of Example 1) were added and agitation continued. In the last 10 minutes of an hour of stirring there were admixed 1.375 grams of the PVA (same as in Example 1).

Six-tenths of the resulting dispersed slurry then was poured over the hand sheet screen of an ordinary laboratory paper hand sheet former (having a 30.48 cm. high brass tank with a 20.32 cm. square base) and mixed from the top. The water discharge valve was opened with the solids of the slurry developing in sheet form on the screen and the water dripping through the screen by gravity from the increasing density slurry. After no further water drained off by gravity, the wet sheet was dried in a drying oven by a hot air stream of 121° C. flowing through it for 5 minutes. The resulting 12.57 grams dry hand sheet mat showed a tensile strength of 1.41 kilos per cm. and porosity of 579 liters per minute per square decimeter at a pressure differential of 2.54 cm. ($H_2O$).

Example 2 includes no sodium hexametalphosphate and sulfuric acid because the micro-bits tend to enhance dispersion of the glass fibers which as introduced into the water appear to a large extent in a multitude of bundles of the fibers. Other mats of this invention can be made similarly without these two inorganic substances, from micro-bits of the other effective polymers.

EXAMPLE 3

Example 2 Mat With Cobeat Binder Instead Of PVA

Example 2 was repeated except that during the agitation after admixing the glass fibers, instead of PVA there was admixed 60 grams of the cobeat suspension of Example 5 amounting to 1.2 grams of the cobeat solids (composed of beater beaten, interlocked wet lap cotton fibers and polystyrene micro-bits). The preparation of the mat then was completed as in Example 2. The resulting dry mat showed porosity of 335 liters per minute per sq. dcm., at 2.54 cm. ($H_2O$) differential pressure (gage), and tensile strength of 0.61 kg. per cm.

EXAMPLE 4

Example 3 With Polystyrene Replacing Polyurethane

Example 3 was repeated by using polystyrene micro-bits instead of the polyurethane micro-bits, and also cobeat as the binder instead of PVA. The resulting dry web showed tensile strength of 0.22 kg. per cm. and porosity of 305 LPM per square decimeter at differential pressure of 2.54 cm. ($H_2O$).

The adsorbent (constituent) containing gas-vapor filtering or treating mats of this invention are illustrated by, but not restricted to, the following:

EXAMPLE 5

Activated Carbon-containing Adsorption Mat

(a) Cobeat Suspension Preparation

A cobeat suspension (so-called because wet lap cotton fibers and micro-bits are beaten together in a beater) was prepared by charging 363.6 kilos (dry basis) of wet lap cotton fibers (as used in paper making, containing 1454.4 liters of water in the fibers) and 181.8 kilos (dry basis) of polystyrene micro-bits (6% solids with 2848.5 liters of bound water) into 13,354 liters of water in a pulper and agitated for 3 minutes (as in Example 1)

thereby dispersing the cotton fibers and micro-bits free of clumps and clusters in the water.

That cotton fibers and micro-bits dispersion was pumped to a (paper making) beater having its pressure roll set at 65% of maximum and run at 110 r.p.m. for 6 hours (when the freeness starting at 760 was found to have dropped to 600). The roll setting then was changed to provide more fibrillation and less cutting action, by using only the brush roll pressure with the roll barely contacting the bed. The desired end occurred in two hours when the freeness was found reduced to 450. The beater content (now the cobeat suspension) was retained in the beater under merely sufficient agitation for the dispersion to remain in suspension for later use.

The wet lap cotton fibers are those commonly used in writing paper making to provide its cotton rag content. They are prepared for the most part from cotton fabric cuttings and cotton linters which are washed (bleached if necessary) and separated into fibers (as in a hollander) of from about 4.23 mm. to about 1.27 cm. in length, fed to a wet lap machine and from it as a web between pressure rolls and leaving as a web about 2.1 mm. thick (containing about 80% moisture) and then lapped up and back over and over on a pallet usually to a pile of about 363.8 kilos gross weight.

(b) Micro-bits Suspension

Into 7570 liters of water in the pulper, there was admixed 136.4 kilos (dry basis) of the polystyrene micro-bits (as the water-bound product containing 16% micro-bits solids and 715.9 liters of water) and agitated to a uniform dispersion and maintained under merely sufficient agitation for that until shortly needed.

(c) Furnish Supply Suspension

A furnish supply suspension was prepared in a beater chest.

(i) by feeding into it 30,280 liters of water, (ii) admixing into the water 189.3 liters of the foregoing cobeat suspension, thus providing a diluted cobeat suspension.

(iii) followed by admixing 91 kilos of readily water dispersible, semi-dull, optically whitened polyethylene terephthalate polyester (beneficially in 1.27 cm. long fibers of 1.5 denier spun by conventional melt [process,] *process) having a special finish compatible with most anionic, cationic or nonionic binders (and providing rapid and excellent dispersion with a wide variety of furnish systems and additives), and solution viscosity of* 770±20 of ½ gram dissolved in 50 ml. of solvent (by weight, 40 parts [and] tetrachloroethane and 60 parts phenol) at 25° C. (solution viscosity is the viscosity of the polymer solution divided by the viscosity of the solvent, with the result minus one multiplied by 1000); melting point 48.67° C., non-shrinkable in boiling water, and elongation at break 45% (available as TREVIRA 101, product of American Hoechst Corporation, Fibers Division, Spartenburg, South Carolina 29301), (iv) admixing 172.7 kilos of finely divided activated carbon (Nuchar S-N, product of Westvaco Corporation, Covington, Va. 24426); and also (v) admixing the foregoing micro-bits suspension containing the 136.4 kilos (dry basis) of polystyrene micro-bits as the water-bound product (having about 16% micro-bits solids) thereby adding 716 liters of water to the 7570 liters initially included; and finally (vi) adding 4163.5 liters of the cobeat suspension (containing 193.4 kilos of solids) and 15,140 liters of the just below identified glass fibers, micro-bits and binder suspension containing 187.7 kilos of suspended solids.

(d) Glass Fibers, Micro-Bits And Binder Suspension

This suspension was prepared by the procedure used in (the first 4 paragraphs of) Example 1 by charging into a pulper 11,354 liters of water, admixing 22.73 kilos (dry basis) of polystyrene micro-bits as the water-bound product (containing 6% solids and 356 liters of water), dissolving 22.73 kilos of sodium hexametaphosphate and 3.8 liters of sulfuric acid (98.6%), and admixing 113.64 kilos of the same 6.35 mm. length glass fibers and 10.23 kilos of the same PVA fibers. This suspension then was pumped to a beater chest.

The pulper then was rinsed by adding 3785 liters of water and agitating the content as in Example 1. The resulting rinse suspension then was admixed with the pulper suspension in the beater chest, thus providing the glass fibers, micro-bits and binder suspension, as the second member of the constituent (vi) of the furnish supply suspension.

While maintained under agitation in the beater supply chest, this uniformly admixed furnish supply suspension was fed to the Fourdrenier machine head box at the same rate and admixture with dilution water as in Example 1, and onto the moving Fourdrenier screen. After passing the suction boxes, the resulting wet web continued onto the endless belt conveyor and then was dried by passing in sequence under the battery of infrared lamps through the tunnel dryer and under and over the series of six dryer drums.

The final activated carbon-containing adsorbing mat was uniform in appearance with a basis weight of 15 to 15.45 kg., porosity of 353.7 liters per minute per square decimeter at a pressure differential of 2.54 cm. ($H_2O$), and tensile strength of 1.074 kilos per cm. in the machine direction and 0.895 kilos per cm. in the cross direction.

EXAMPLE 6

Molecular Sieve-Containing Adsorption Mat

Example 5 was repeated but with its 172.7 kilos of activated carbon replaced by the same amount of the gas-vapor adsorbent, zeolite molecular sieve powder particles having nominal pore diameter of 5 Angstroms and the chemical formula $Ca_{4.5}Na_3[(AlO_2)_{12}(SiO_2)_{12}]$. The resulting mat showed tensile strength much like that of the mat of Example 5 and porosity of about 410 liters per minute per square decimeter at 2.54 cm. ($H_2O$).

The polystyrene micro-bits of Examples 1, 4, 5 and 6 can be replaced in part or as a whole by micro-bits of any other of the applicable expanded thermoplastic styrene-polymers or of expanded lower polyolefins or of flexible polyurethanes, each of them non-brittle in expanded form. Thus, each such repeat of Examples 1, 4, 5 and 6 by the just indicated replacement of expanded polystyrene micro-bits is to be considered as if occurring herein in full as a complete example, thereby avoiding making this specification prolix. The lower polyolefins from polyethylene to poly-methylpentene include also polypropylene and polybutene.

In any of Examples 1 to 5, and any of the just above indicated modifications of any of them, the micro-bits can be provided with any amount of water held by them as well as in the dry state. The micro-bits were provided in these examples as used along with different amounts of water held by them, because of their ready availability in that form and their thus lower cost.

Similarly, the cotton fibers used in preparing the cobeat were provided in their form as wet lap cotton fibers, ordinarily containing about 80% of water, because of the economy in doing so. However, that does not preclude using these cotton fibers in the dry state when thus available or desired for any particular reason.

The Westvaco's NUCHAR S-N activated carbon in Example 5 can be replaced by any other Westvaco activated carbon. For example, if the mat is to be used for adsorbing phenol, Westvaco's NUCHAR N-A (yielding an acid wash water when washed in water) would be beneficial because that acid grade manifests higher adsorption of phenol.

Either of these two grades of activated carbon can be replaced by any of the others available, for example, DARCO now available from I.C.I. (U.S.A.) Ltd., and the NORIT product of American Norit Co. The Barneby-Cheney activated carbon from pecan nut shells is highly effective, for example, in the adsorption of sulfur dioxide from a gas stream, for which it showed a very much greater adsorption capacity than an activated carbon from another source. Thus, Example 5 is to be considered as if presented written out in full with its activated carbon replaced by the Barneby-Cheney product, or any other available suitable finely divided activated carbon.

The polyester of Examples 5 and 6 can be replaced by any other fiber-forming terephthalate polyester, for example, the FORTREL polyethylene terephthalate or by the KODEL dimethyl 1,4-cyclohexane dimethanol terephthalate. The molecular sieve particles of Example 6 (The Linde 5A product Union Carbide Corporation of 270 Park Avenue, New York, N.Y.) may be replaced as a whole, or in part, by any other such molecular sieve particles, e.g. having nominal pore diameter of from 4 to about 10 Angstroms. Examples 5 and 6 and the thus resulting examples derived from them are to be considered as if presented as written out in full with the polyester or molecular sieve particles separately respectively replaced by each one of these other polyesters or molecular sieve particles. Any of the polyesters can be used in any of the available 1.5 and 3 denier diameters.

The mats of this invention are effective for removal and/or recovery of various gases or vapors, either inorganic or organic, for example, sulfur dioxide, chlorinated alkanes sucgh as carbon tetrachloride and other chlorinated alkanes, and benzene and phenol.

While the invention has been explained by detailed description of certain specific embodiments of it, it is understood that various substitutions or modifications can be made in any of them within the scope of the appended claims which are intended to cover also equivalents of these embodiments.

What is claimed is:

1. A gas-vapor treating mat which comprises (a) glass fibers, of about 6.3 millimeters long and below a length at which they are prone to roping and from about 3 to about 12 microns in diameter, intermixed [in the range of from about 4 to about 45 parts] with (b) from about 5 to about 50% [parts] of the micro-bits of [any of an expanded, thermoplastic styrene-polymer, an expanded lower polyolefin selected from polyethylene to polymethylpentene, and] and a flexible foamed polyurethane *which are in the form of tripodal particles having generally uneven length legs, said particles comprising broken and inter-connected strand portions from adjacent cells of said flexible foamed polyurethane, said strand portions being substantially free of intact cell windows and having hook-like projections, indentations and flutes extending therefrom, said hook-like projections, indentations and flutes having been formed by the destruction of the cell windows of said flexible foam,* [each said polymer being non-brittle in its initial expanded form;] said intermixed glass fibers and polymer micro-bits being held together in sheet or elongated web form and permeable to any of a gaseous and vaporous fluid stream by (c) a binding agent distributed throughout the intermixture of the glass fibers and micro-bits in an amount and manner sufficient to hold them together in the herein noted form and without destroying their permeability, which agent is selected from (i) a compatible organic binder insoluble in cold water and soluble in hot water and inert to the glass fibers, the micro-bits and any other mat constituent as well as to any gas or vapor or entrained droplets or aerosols and fine particles that are to contact the mat and (ii) a cobeat of cotton fibers and any of the micro-bits; whereby the mat has tensile strength from about 0.2 to about 5.3 kilograms per centimeter.

2. A gas-vapor treating mat as claimed in claim [1,] *35* wherein the micro-bits are those of a styrene-polymer.

3. A gas-vapor treating mat as claimed in claim 2, wherein the micro-bits are of polystyrene.

[4. A gas-vapor treating mat as claimed in claim 1, wherein the micro-bits are those of a polyurethane.]

5. A gas-vapor treating mat as claimed in claim [1,] *35* wherein the micro-bits are those of a lower polyolefin.

6. A gas-vapor treating mat as claimed in claim 5, wherein the polyolefin is polyethylene.

7. A gas-vapor treating mat as claimed in [any of claims 1 to 5 or 6] *claim 1 or 34*, wherein the binding agent is polyvinyl alcohol at least 98% hydrolyzed.

8. A gas-vapor treating mat as claimed in [any of claims 1 to 5 or 6] *claim 1 or 34* wherein the binding agent is a cobeat of the cotton fibers and [any of] the micro-bits.

9. A gas-vapor treating mat as claimed in claim [7,] *35,* which contains by weight 77.2% of glass fibers, 15.8% of polystyrene micro-bits and about 6.97% of the polyvinyl alcohol, and wherein the glass fibers are about 6.35 millimeters long and 6.3 microns in diameter.

10. A gas-vapor treating mat as claimed in claim 1, which in addition to its content of glass fibers, the micro-bits and the binding agent, contains by weight of the overall content of the mat, intermixed therein (i) a particulate additive selected from any of activated carbon and gas-vapor adsorbent crystalline zeolite molecular sieve particles, and in an amount from about 2% to that amount beyond which more than insignificant dusting of carbon or molecular sieve particles from the mat would occur, (ii) a fiber-forming terephthalate polyester in a amount from about 5 to about 10%, and (iii) the cobeat in an amount of from about 2 to about 30% as the binding agent.

11. A gas-vapor treating mat as claimed in claim 10, wherein the particulate additive is activated carbon.

12. A gas-vapor treating mat as claimed in claim 10, wherein the particulate additive is the crystalline zeolite molecular sieve particles.

[13. A gas-vapor treating mat as claimed in claim 11 or 12, wherein the micro-bits are those of any of an expanded styrene-polymer, a flexible polyurethane, and an expanded lower polyolefin.]

14. A gas-vapor treating mat as claimed in claim [13,] *10,* wherein the polyester is any of (a') polyethylene terephthalate and (b') the dimethyl terephthalate of 1,4-cyclohexane dimethanol.

15. A gas-vapor treating mat as claimed in claim 10, wherein the fiber-forming polyester is the polyethylene terephthalate polyester which is readily water dispersible, semi-dull, optically whitened, in 1.27 cm. long fibers of 1.5 denier, having a finish compatible with most anionic, cationic or nonionic binders and providing rapid and excellent dispersion with a wide variety of furnish systems and additives, and a solution viscosity at 25° C. of 770±20 of ½ gram when dissolved in 50 ml. of a solvent consisting by weight of 40 parts of tetrachloroethane and 60 parts of phenol; a melting point of 48.67° C., being non-shrinkable in boiling water, and having elongation of 45% at break.

*16. A fluid-permeable gas-vapor treating mat which comprises a sheet or elongated web formed from a mixture of:*

*(a) glass fibers from 6.35 millimeters long to below a length at which said fibers are prone to roping, and from 3 to 12 microns in diameter;*

*(b) micro-bits of an expanded, thermoplastic polymer which is non-brittle in its initial expanded form, and is selected from a styrene polymer, and a polyolefin, selected from polyethylene, polypropylene, polybutene and polymethylpentene, said polymer micro-bits being from about 40 to about 325 microns long and from about 20 to about 325 microns wide, from substantially completely to entirely completely free of intact cells of the expanded polymer from which said micro-bits were produced, substantially without any uniformity in outline of the individual micro-bits particles, and having density from about 85 percent of, to about substantially the same as, the specific unexpanded polymer from which there was provided said expanded polymer from which said micro-bits are produced, and said micro-bits comprising from about 2 to about 50% by weight of the finished mat; and*

*(c) a binding agent selected from (a) a compatible organic binder insoluble in cold water and soluble in hot water and inert to the glass fibers, the micro-bits and any other mat constituent, or (b) a cobeat of cotton fibers, and any of said micro-bits, said binding agent being distributed throughout said mat, and comprising from about 2% to about 10% by weight of the finished mat when the organic binder (a) is used, or from about 5.8% to about 11% by weight of the finished mat when the cobeat (b) is used.*

*17. A gas-vapor treating mat as claimed in claim 16, wherein the micro-bits are those of a styrene-polymer.*

*18. A gas-vapor treating mat as claimed in claim 17, wherein the styrene-polymer is polystyrene.*

*19. A gas-vapor treating mat as claimed in claim 16, wherein the micro-bits are those of a lower polyolefin.*

*20. A gas-vapor treating mat as claimed in claim 19, wherein the polyolefin is polyethylene.*

*21. A fluid-permeable gas-vapor treating mat which comprises a sheet or elongated web formed from a mixture of:*

*(a) glass fibers from 6.35 millimeters long to below a length at which said fibers are prone to roping, and from 3 to 12 microns in diameter;*

*(b) micro-bits of a flexible foamed polyurethane which are in the form of tripodal particles having generally uneven length legs, said particles comprising broken and inter-connected strand portions from adjacent cells of said flexible foamed polyurethane, said strand portions being substantially free of intact cell windows and having hook-like projections, indentations and flutes extending therefrom, said hook-like projections, indentations and flutes having been formed by the destruction of the cell windows of said flexible foam, said micro-bits comprising from about 2 to about 50% by weight of the finished mat; and*

*(c) a binding agent selected from (a) a compatible organic binder insoluble in cold water and soluble in hot water and inert to the glass fibers, the micro-bits and any other mat constituent, or (b) a cobeat of cotton fibers, and any of said micro-bits, said binding agent being distributed throughout said mat, and comprising from about 2% to about 10% by weight of the finished mat when the organic binder (a) is used, or from about 5.8% to about 11% by weight of the finished mat when the cobeat (b) is used.*

*22. A gas-vapor treating mat as claimed in claim 21 or 16, wherein the organic binder (a) is employed.*

*23. A gas-vapor treating mat as claimed in claim 22, wherein the organic binder is polyvinyl alcohol at least 98% hydrolyzed.*

*24. The gas-vapor treating mat as claimed in claim 23 wherein the micro-bits are polystyrene.*

*25. The gas-vapor treating mat as claimed in claim 23 wherein the micro-bits are polyethylene.*

*26. A gas-vapor treating mat as claimed in claim 24, which contains 77.2% of glass fibers, 15.8% of polystyrene micro-bits and about 6.97% of the polyvinyl alcohol, and wherein the glass fibers are about 6.35 millimeters long and 6.3 microns in diameter.*

*27. A gas-vapor treating mat as claimed in claim 22 which also includes:*

*(i) a particulate additive selected from finely divided activated carbon or gas-vapor adsorbent crystalline zeolite molecular sieve particles, in an amount from about 2% by weight to below that at which more than insignificant dusting of the particulate additive from the finished mat would occur.*

*(ii) a fiber-forming terephthalate polyester in an amount of from about 2% to about 12.2% by weight of the finished mat, and*

*(iii) cobeat in an amount from about 2 to about 30% by weight of the finished mat.*

*28. The gas-vapor treating mat, as claimed in claim 27, wherein said particulate additive is activated carbon and comprises no more than 50% by weight of said finished mat.*

*29. The gas-vapor treating mat, as claimed in claim 27, wherein said particulate additive is gas-vapor adsorbent crystalline zeolite molecular sieve particles, and comprises no more than 75% by weight of said finished mat.*

*30. A gas-vapor treating mat as claimed in claim 27, wherein the polyester is polyethylene terephthalate.*

*31. A gas-vapor treating mat as claimed in claim 30, wherein the polyethylene terephthalate polyester is in the form of readily water dispersible, semi-dull, optically whitened, fibers having a finish compatible with most anionic, cationic or nonionic binders and providing rapid and excellent dispersions with a wide variety of furnish systems and additives, and a solution viscosity at 25° C. of 770+ 20 of ½ gram when dissolved in 50 ml. of a solvent consisting by weight of 40 parts of tetrachloroethane and 60 parts of phenol; a melting point of 48.67° C., being non-shrinkable in boiling water, and having elongation of 45% at break.*

*32. A gas-vapor treating mat as claimed in claim 21 or 16, wherein the cobeat binder (b) is employed.*

*33. The gas-vapor treating mat as claimed in claim 24, wherein the cobeat binder comprises cotton fibers, prepared by wet lapping, and polystyrene micro-bits.*

*34. A gas-vapor treating mat which comprises (a) glass fibers, of about 6.3 millimeters long and below a length at which they are prone to roping and from about 3 to about 12 microns in diameter, intermixed with (b) from about 5 to about 50% of micro-bits of thermoplastic styrene-polymer, or an expanded lower polyolefin selected from polyethylene to poly-methylpentene, each said polymer being non-brittle in its initial expanded form; said polymer micro-bits being from about 40 to about 325 microns long and from about 20 to about 325 microns wide, from substantially completely to entirely completely free of intact cells of the expanded polymer from which said micro-bits are produced, substantially without any uniformity in outline of the individual micro-bits particles, and having density from about 85 percent of, to about substantially the same as, the specific unexpanded polymer from which there was provided said expanded polymer from which said micro-bits are produced, said intermixed glass fibers and polymer micro-bits being held together in sheet or elongated web form and permeable to any of a gaseous and vaporous fluid stream by (c) a binding agent distributed throughout the intermixture of the glass fibers and micro-bits in an amount and manner sufficient to hold them together in the herein noted form and without destroying their permeability, which agent is selected from (1) a compatible organic binder insoluble in cold water and soluble in hot water and inert to the glass fibers, the micro-bits and any other mat constituent as well as to any gas or vapor or entrained droplets or aerosols and fine particles that are to contact the mat and (ii) a cobeat of cotton fibers and any of the micro-bits; whereby the mat has tensile strength from about 0.2 to about 5.3 kilograms per centimeter.*

* * * * *

UNITED STATES PATENT AND TRADEMARK OFFICE

CERTIFICATE OF CORRECTION

PATENT NO. : Re. 31,849

DATED : March 19, 1985

INVENTOR(S) : Max Klein

It is certified that error appears in the above-identified patent and that said Letters Patent is hereby corrected as shown below:

Col. 1, line 67, "evnironmental" should be --environmental--;

Col. 3, line 3, delete "to" (second occurence);

Col. 3, after line 6, "cm." delete the rest of the line;

Col. 3, delete lines 7 and 8 in their entirety;

Col. 8, line 5, "of" should be --or--;

Col. 8, line 32, "hexametaphosphat" should be --hexametaphosphate--;

Col. 9, delete the third full paragraph, from "At...(gage).";

Col. 10, line 20, after "cm." delete the rest of the line;

Col. 10, delete lines 21 and 22 in their entirety;

Col. 10, line 41, after "showed" delete the rest of the line;

Col. 10, delete line 42 in its entirety;

Col. 10, line 43, delete "(gage), and";

UNITED STATES PATENT AND TRADEMARK OFFICE

CERTIFICATE OF CORRECTION

PATENT NO. : Re. 31,849

DATED : March 19, 1985

INVENTOR(S) : Max Klein

It is certified that error appears in the above-identified patent and that said Letters Patent is hereby corrected as shown below:

Col. 10, delete lines 51 and 52 in their entirety;

Col. 12, line 34, after "15.45 kg.," delete the rest of the line;

Col. 12, delete line 35 in its entirety;

Col. 12, line 49, after "Example 5" delete the rest of the line;

Col. 12, delete lines 50 and 51 in their entirety;

Col. 13, line 48, "sucgh" should be --such--;

Claim 1, line 9, delete "and" (second occurence);

Claim 2, line 2, "35" should be --34--;

Claim 5, line 2, "35" should be --34--;

Claim 9, line 2, "35" should be --34--;

Claim 10, line 1, after "1" insert --or 34--;

Claim 33, line 1, "24" should be --32--;

Signed and Sealed this

*Nineteenth* Day of *November 1985*

[SEAL]

*Attest:*

DONALD J. QUIGG

*Attesting Officer* *Commissioner of Patents and Trademarks*